(12) United States Patent
Buisson

(10) Patent No.: US 8,864,372 B2
(45) Date of Patent: Oct. 21, 2014

(54) DEVICE FOR MEASURING THE TEMPERATURE OF WATER COVERING A ROAD SURFACE

(75) Inventor: Jeremy Buisson, Saint-Saturnin (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 193 days.

(21) Appl. No.: 13/046,227

(22) Filed: Mar. 11, 2011

(65) Prior Publication Data

US 2011/0228813 A1 Sep. 22, 2011

(30) Foreign Application Priority Data

Mar. 16, 2010 (FR) ....................................... 10 51868

(51) Int. Cl.
*G01K 7/02* (2006.01)
*G01K 13/00* (2006.01)
*G01K 13/02* (2006.01)

(52) U.S. Cl.
CPC ................ *G01K 13/00* (2013.01); *G01K 13/02* (2013.01)
USPC ............................ 374/141; 374/208; 374/163

(58) Field of Classification Search
USPC .......................................... 374/141, 208, 163
See application file for complete search history.

(56) References Cited

U.S. PATENT DOCUMENTS

| 3,812,708 | A | * | 5/1974 | Cowan et al. | .................... 73/598 |
| 4,577,781 | A | * | 3/1986 | Braun | .............................. 222/54 |
| 5,029,194 | A | * | 7/1991 | Young et al. | ..................... 378/89 |
| 5,745,051 | A | * | 4/1998 | Doherty et al. | ............... 340/905 |
| 6,206,299 | B1 | * | 3/2001 | Mann et al. | ...................... 239/69 |
| 7,301,445 | B2 | * | 11/2007 | Moughler | ...................... 340/442 |
| 7,839,301 | B2 | * | 11/2010 | Doherty et al. | ............... 340/905 |
| 2004/0262425 | A1 | * | 12/2004 | Sakai et al. | .................... 239/128 |
| 2005/0058177 | A1 | * | 3/2005 | Leonhardt | ........................ 374/16 |
| 2005/0189432 | A1 | * | 9/2005 | Kime | .................................. 239/1 |
| 2006/0144121 | A1 | | 7/2006 | Neubert et al. | ...................... 73/7 |

FOREIGN PATENT DOCUMENTS

DE 10 2006 026 436 A1 12/2007
WO WO 97/13234 A1 4/1997

OTHER PUBLICATIONS

Translation of DE 102006026426A1 (Dec. 13, 2007).*

* cited by examiner

*Primary Examiner* — Mirellys Jagan
(74) *Attorney, Agent, or Firm* — Fitzpatrick, Cella, Harper & Scinto

(57) ABSTRACT

A device for measuring the temperature of water covering a road surface includes a member for measuring water temperature and channelling means for channelling the water covering the road surface. The channelling means includes a measuring chamber for measuring the temperature of the water covering the road surface. The measuring member includes a temperature measuring head situated in the measuring chamber. The device also includes driving means for driving the device over the road surface, the means being arranged in such a way that the temperature measuring head is situated at some distance from the road surface.

4 Claims, 3 Drawing Sheets

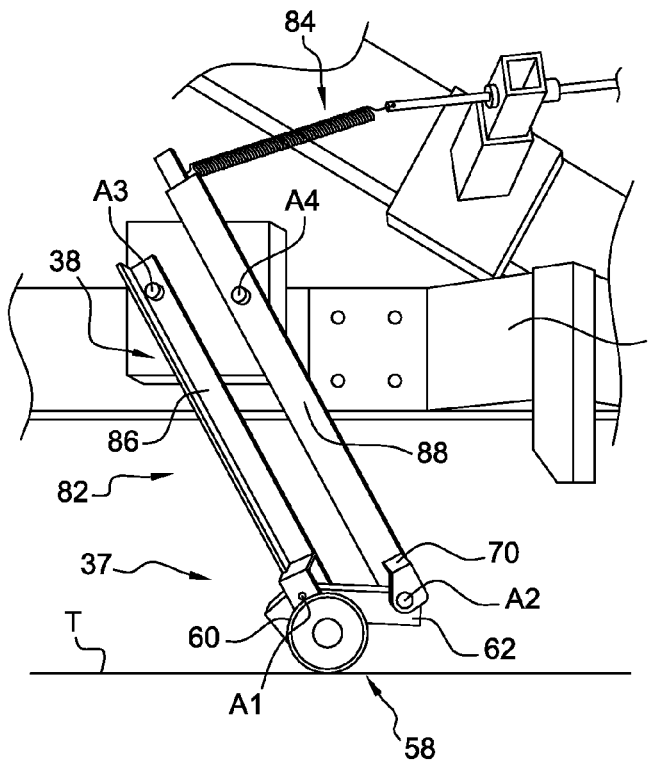
Fig. 4
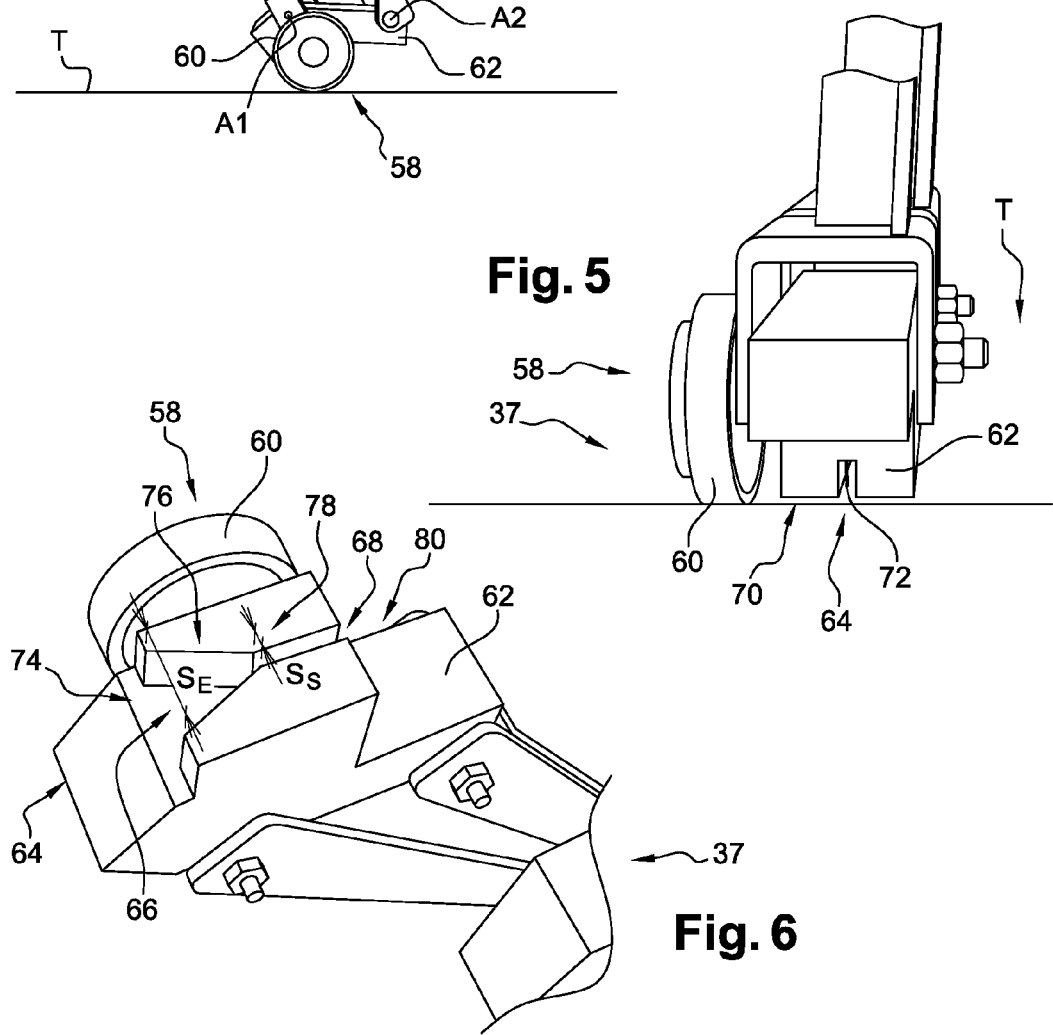
Fig. 5
Fig. 6

DEVICE FOR MEASURING THE TEMPERATURE OF WATER COVERING A ROAD SURFACE

FIELD OF THE INVENTION

The present invention relates to the field of measuring the temperature of the water covering a road surface.

RELATED ART

The prior art discloses a method for measuring the performance of a tire on a wet road surface during which method use is made of a test vehicle, for taking measurements on a road surface covered with water, comprising a single tank and means of sprinkling using water from the single tank.

The road surface is sprinkled upstream of the tire being tested using the sprinkling means when the vehicle is running, and certain tire parameters and external parameters, notably the temperature of the water covering a road surface downstream of the tire and over which the tire has driven, are measured. To do this, the vehicle includes means of measuring this temperature comprising an infrared pyrometer.

However, the temperature measurement taken by the infrared pyrometer is disturbed, firstly, by the reflection of light off the wet road surface and, secondly, by water that has been nebulised by the tire and forms a mist of droplets behind this tire. Specifically, these droplets form reflective bodies the temperature of which alters very soon after the tire has passed over them and which differs from the temperature of the water covering the road surface and over which the tire has driven.

SUMMARY OF THE INVENTION

It is therefore an object of the invention to provide a precise measurement of the temperature of the water covering the road surface and over which the tire has driven.

To this end, an embodiment of the invention is a device for measuring a temperature of water covering a road surface, the device including a measuring member for measuring the temperature of the water,
characterized in that:
the device includes channelling means for channelling the water covering the road surface, the channelling means including a measuring chamber for measuring the temperature of the water covering the road surface,
the measuring member includes a measuring head situated in the measuring chamber, and
the device includes driving means for driving the device over the road surface, the driving means being arranged in such a way that the temperature measuring head is situated at some distance from the road surface.

Thanks to the device according to this embodiment of the invention, the temperature of the water covering a road surface and over which the tire has driven can be measured accurately. The water for which the temperature is measured is the water covering the road surface when the device drives on this road surface. Specifically, by taking a measurement using direct contact between the water and the measuring head inside the measuring chamber, disturbances associated with the reflections of the environment of the pyrometer off the water covering the road surface and off the nebulised droplets are avoided. In addition, the channelling means make it possible to ensure that there is water over the measuring head.

Furthermore, the way in which the driving means is arranged avoids contact between the road surface and the measuring head and thus avoids any problem of wearing of the measuring member through friction upon contact with the road surface.

Preferably, the measuring member is a thermocouple.

According to other embodiments of the invention, optional features of the device include one or more of the following:
the channelling means including a collecting chamber in which to collect the water covering the road surface situated upstream of the measuring chamber when considering the direction in which the water flows with respect to the device,
the collecting chamber has a flared overall shape, the water channelling section of which narrows when considering the direction of flow of water with respect to the device.

Such a collecting chamber allows the water to be channelled so that the measuring head is sufficiently immersed in the water covering a road surface.

Another embodiment of the invention is a test vehicle for making measurements on a road surface covered with water, the test vehicle including:
a sprinkler for sprinkling the road surface with water taken from the vehicle,
a measuring device as defined hereinabove, and
a tire to be tested, positioned downstream of the sprinkler for sprinkling the road surface and upstream of the measuring device when considering the direction of travel of the vehicle, so that when the vehicle is running, the tire drives over at least some of the sprinkled water and the measuring device measures the temperature of at least some of the water over which the tire has driven.

The measuring device measures the temperature of the water covering the road surface when the measuring device drives on this road surface. Such a test vehicle makes it possible accurately to measure variations in the temperature of the water over which the tire has driven. Such a test vehicle is notably used for simulating and studying the grip of a tire on a wet road surface.

According to other embodiments of the invention, optional features of the test vehicle include one or more of the following:
water storage means including a source of water referred to as a cold source, and a source of water referred to as a hot source, the water from the cold source having a lower temperature than the water from the hot source,
a mixer for mixing the water from the cold and hot sources.

In order to study the behaviour of the tire on a wet road surface, use is made of one or several predetermined wet road surfaces. The behaviour of the tire is notably dependent on the temperature of the water covering the road surface but is also dependent on the level of grip afforded by the road surface. The temperature of the water covering the road surface is dependent on the external temperature, which varies according to the time of year, and the location at which the tire behaviour is being studied. In the prior art, it is necessary to study the behaviour throughout the year in order to obtain data over a range of temperatures that are representative of the conditions in which the tire will be used, for example between 0° C. and 35° C. However, over the course of the year, the level of grip offered by the road surface varies which means that it is not possible to obtain tire behaviour data that can be compared against one another.

Thanks to the test vehicle according to embodiments of the present invention, it is possible, over a very short amount of time of the order of a few hours, to study the behaviour over the entire range of temperatures representative of the conditions of use of the tire. Over this amount of time, the level of grip offered by the road surface remains constant and therefore allows comparable tire behaviour data to be obtained.

Optionally, according to an embodiment of the invention, the vehicle includes means for suspending the measuring device with respect to the vehicle.

The measuring device and the driving means are thus kept in contact with the road surface so that the water covering the road surface enters the measuring chamber regardless of the condition of the road surface.

Another embodiment of the invention is a method for measuring the temperature of water covering a predetermined wet road surface, wherein:
- a vehicle as defined hereinabove is driven over the road surface,
- the road surface is sprinkled with water from the vehicle at least at first and second different temperatures in succession, and
- for each first and second temperature, the temperature of the water that has been sprinkled and over which a tire P is driven, is measured.

Thanks to the method of this embodiment of the invention, the behaviour of the tire can be studied for different temperatures of water covering the road surface over a relatively short amount of time that is not long enough to allow the level of grip of the road surface to change.

Advantageously, the vehicle is driven over another predetermined road surface and this other road surface is sprinkled with water from the vehicle at least at first and second different temperatures in succession.

Thus, it is also possible to study the behaviour of the tire for different road surfaces exhibiting different levels of grip, over a relatively short amount of time.

BRIEF DESCRIPTION OF THE DRAWINGS

Aspects of the invention will better understood from reading the following description, which is given solely by way of non limiting examples and made with reference to the accompanying drawings, in which:

FIGS. 3 to 7 illustrate a measuring device according to one or more embodiments of the invention.

DETAILED DESCRIPTION OF EMBODIMENTS OF THE INVENTION

Figure 1:
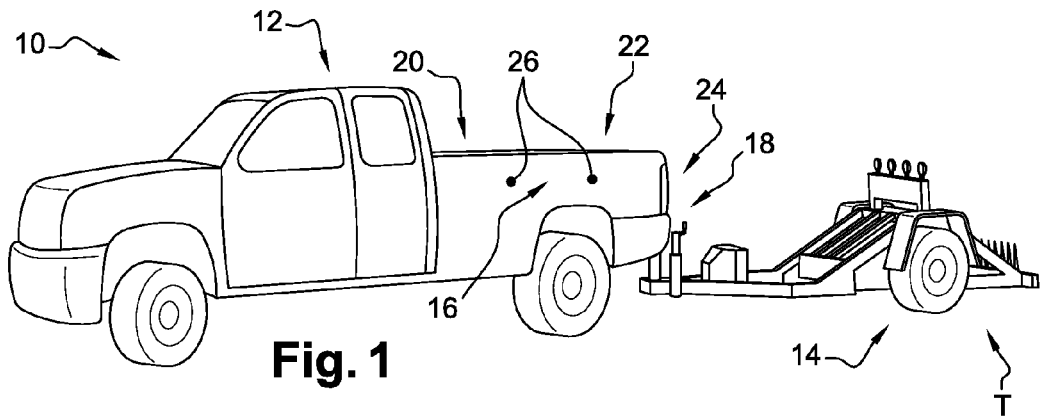
FIGS. 1 and 2 illustrate a vehicle according to an embodiment of the invention.

FIG. 1 depicts a vehicle according to an embodiment of the invention, denoted by the overall reference 10. The vehicle 10 includes a towing vehicle 12 and a trailer 14.

The vehicle 10, in this instance the towing vehicle 12, includes water storage means 16. The vehicle 10 also includes channelling means 18 for channelling water from the storage means 16 to the trailer 14. The storage means 16 includes a source 20, known as a hot source, and a source 22, known as a cold source. Water from the source 22 is at a temperature lower than that of the source 20. The vehicle 10 also includes a controller 24 for controlling a flowrate from each source 20, 22. For example, the controller may include valves. Additionally, the vehicle 10 includes means 26 for measuring a temperature of the water from each source 20, 22.

Figure 2:
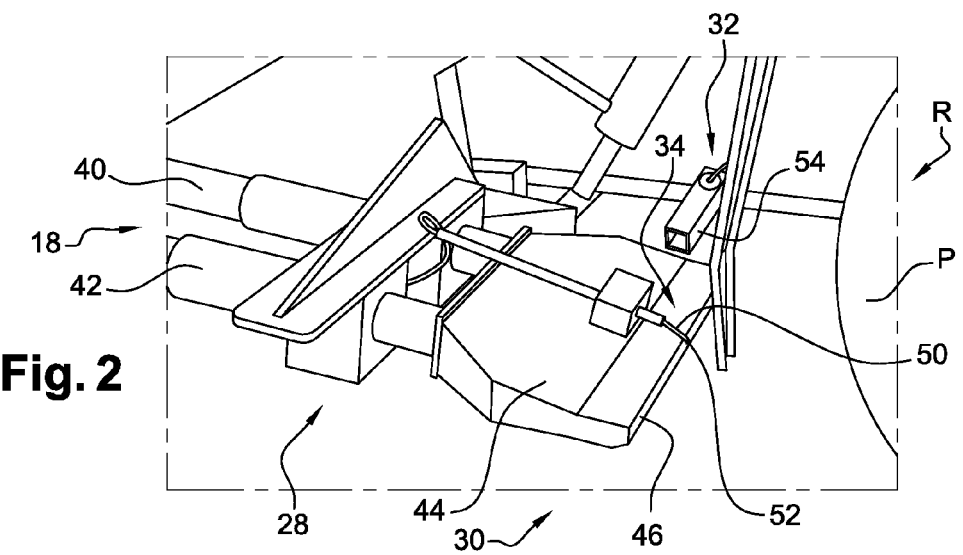
Figure 3:
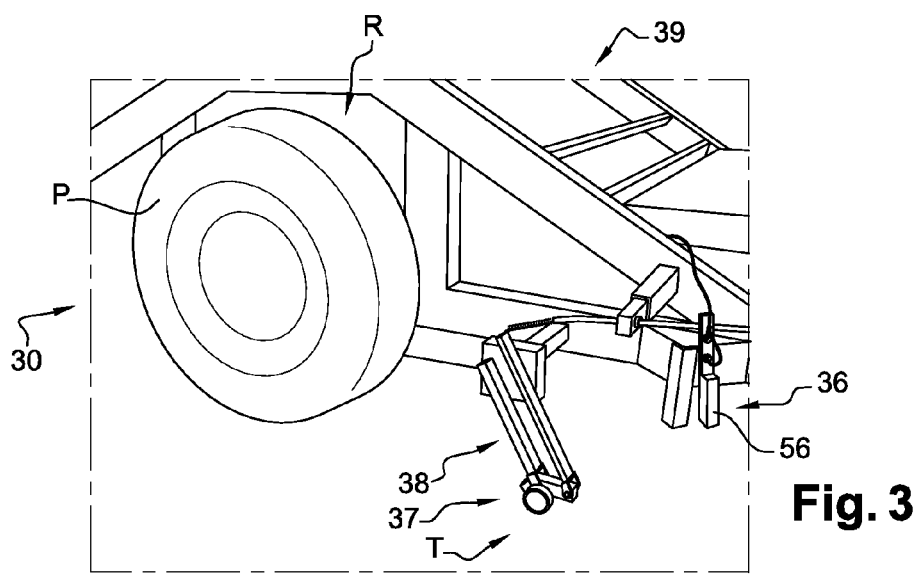

With reference to FIGS. 2 and 3, the vehicle 10, in this instance the trailer 14, includes mixer 28 for mixing the water from the hot source 20 and the cold 22 source. The trailer 14 further includes a sprinkler 30 for sprinkling a road surface T with water from the vehicle 10, in this particular instance with water from the storage means 16. The trailer 14 also includes means 32 for measuring a temperature of the road surface T situated upstream of the road surface T sprinkled by the sprinkler 30 when considering the direction of travel of the vehicle 10 when the vehicle is running, and means 34 for measuring a temperature of water from the sprinkler 30. The trailer 14 further includes a test wheel R fitted with a tire P that is to be tested.

In addition, the trailer 14 includes means 36 for measuring a temperature of the road surface T situated downstream of the road surface T over which the tire P has driven when considering the direction of travel of the vehicle 10 when the vehicle 10 is running, and a device 37 for measuring a temperature of at least some of the water over which the tire P has driven when the vehicle is running. The tire P is situated downstream of the sprinkler 30 and upstream of the device 37 when considering the direction of travel of the vehicle 10 so that, when the vehicle 10 is running, the tire P is driven over at least some of the water sprinkled by the sprinkler 30. The trailer 14 also includes suspension means 38 for suspending the device 37 with respect to the trailer 14. Finally, the vehicle 10 includes means 39 for measuring the coefficients of slip and of grip of the tire P.

As depicted in FIG. 2, the channelling means 18 includes pipes 40, 42 between the mixing means 28 and the hot source 20 and the cold source 22, respectively. The mixing means 28 includes a mixing chamber 44 into which each pipe 40, 42 opens and an outlet 46, in the form of an orifice, for the mixed water.

With reference to FIGS. 3 to 7, the means 26 for measuring the water from each source 20, 22 includes two thermocouples (not depicted). The means 34 for measuring the sprinkled water also includes a thermocouple 50 having a measuring head 52 situated in the outlet 46 so that the measuring head 52 measures the temperature of the water sprinkled by the sprinkler 30. The means 32 and 36 includes infrared pyrometers 54, 56 situated respectively upstream and downstream of the tire P when considering the direction of travel of the vehicle 10 when the vehicle is running.

The device 37 includes driving means 58 for driving the device 37 over the road surface T, the driving means 58 including a wheel 60. The device 37 also includes a support 62 for the driving means 58.

The device 37 further includes channelling means 64 for channelling at least some of the water over which the tire P has driven and which is covering the road surface T upstream of the device 37 when considering the direction of travel of the vehicle 10 when the vehicle is running.

The channelling means 64 includes a collecting chamber 66 for collecting the water over which the tire P has driven and a measuring chamber 68 for measuring the temperature of the water covering the road surface T and which is taken from the collecting chamber 66. The collecting chamber 66 is situated upstream of the measuring chamber 68 when considering the direction in which the water flows with respect to the device 37. The device 37 further includes a member 70 for measuring the temperature of the water over which the tire P has driven and covering the road surface T when the device 37 drives on this road surface T. The member 70 includes a measuring head 72 situated in the measuring chamber 68. In this particular embodiment, the member 70 is a thermocouple.

The driving means 58 is arranged in such a way that the measuring head 72 is situated at some distance from the road surface T when the device 37 is running. In this particular embodiment, the support 62 is situated approximately 1 mm away from the road surface T when the device 37 is running.

Figure 7:
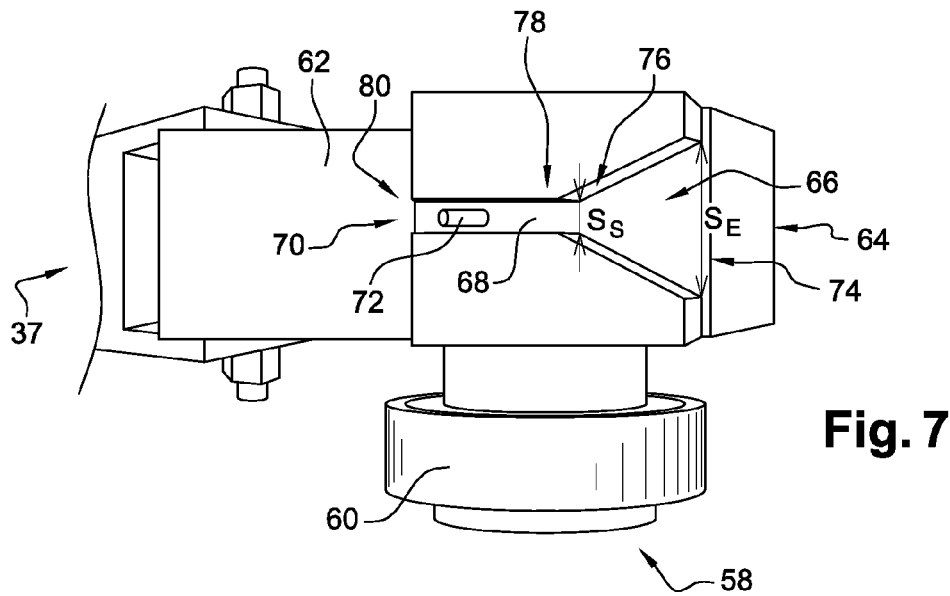

With reference to FIGS. 6 and 7, the collecting and measuring chambers 66, 68 form channels that channel the water and that are delimited, firstly, by the support 62 and, secondly, by the road surface T. Thus, each channel formed by the collecting and measuring chambers 66, 68 is open to the road surface T. The collecting chamber 66 has an inlet 74 of cross section SE and an outlet 76 opening into the measuring chamber 68 and of cross section SS. The collecting chamber 66 forms a channel with a flared overall shape that has a water passage section S that narrows when considering the direction in which the water flows with respect to the device 37. Thus, SS<SE. The measuring chamber 68 has an inlet 78 of cross section SS, the inlet 78 forming the outlet 76 and an outlet 80 opening to outside of the support 62. The measuring chamber 68 forms a channel of constant cross section SS.

With reference to FIG. 4, the suspension means 38 includes a deformable parallelogram 82 and an elastically deformable member 84, in this particular instance a spring. The parallelogram 82 has two bar-like branches 86, 88 mounted such that they can rotate about parallel axes A1, A2 with respect to the support 62 and about parallel axes A3, A4 with respect to a chassis 90 of the vehicle 10, in this instance of the trailer 14. The deformable member 84 is situated between the branch 88 and the chassis 90 to both of which the deformable member 84 is fixed.

Figure 8:
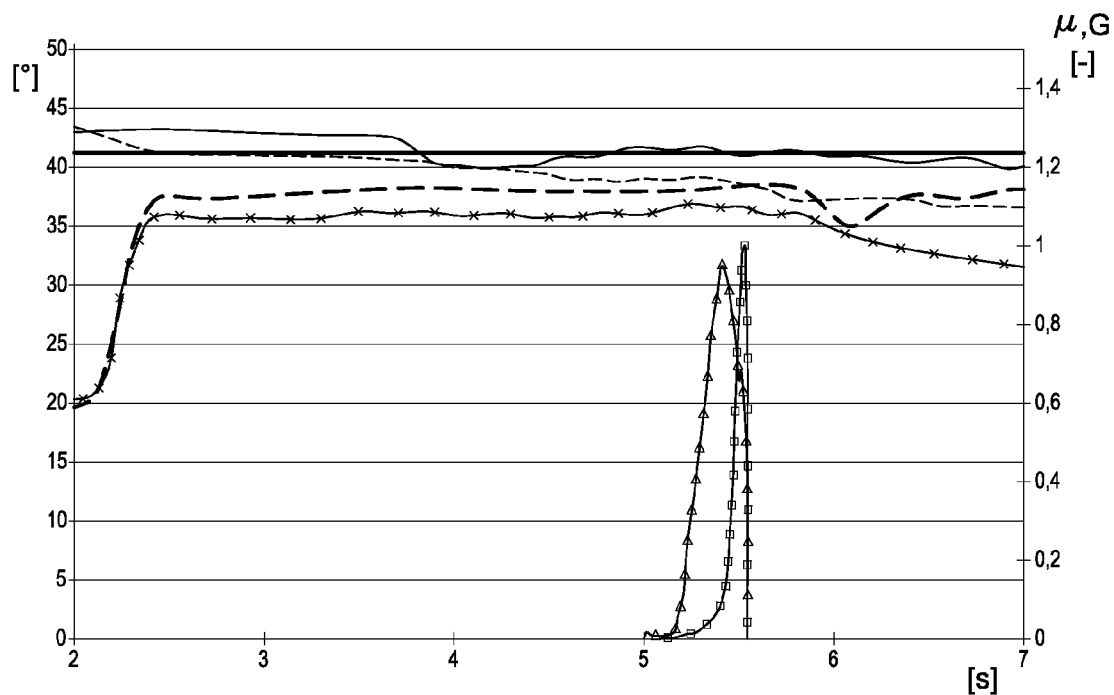
FIG. 8 illustrates a method according to an embodiment of the invention.

FIG. 8 illustrates a chart representing a method of taking measurements on a wet road surface, and which method is implemented by means of the vehicle 10, In this particular embodiment, the method is for measuring a braking performance of the tire P on a wet road surface. FIG. 8 shows variations, as a function of time, in the temperature of the mixed water (the curve in thick continuous line), the temperature of the sprinkled water (the curve in thick broken line) measured by the means 34, the temperature of the ground after sprinkling upstream of the tire P (the curve in thin continuous line) measured by the means 32, the temperature of the ground after sprinkling downstream of the tire P (the curve in thin broken line) measured by the means 36, the temperature of the water downstream of the tire P (the curve drawn with crosses) measured by the device 37, the value of the coefficient of grip of the tire P (the curve drawn with triangles), and the value of the coefficient of slip of the tire P (the curve drawn with squares) measured by the means 39.

The vehicle 10 fitted with the tire P is driven over a first predetermined road surface T1.

During a first cycle and from t=2.1 s onwards, the road surface T1 is sprinkled with water at T=41.5° C., taken from the vehicle 10. The various temperatures are then measured.

At t=5 s, the braking of the tire P begins and the coefficients of slip G and of grip p of the tire P are measured.

At t=5.8 s, the sprinkling stops. Note that the variations in the temperatures measured using the infrared pyrometers 54, 56 (the curves in thin continuous line and in thin broken line) are not consistent with the variations in temperature measured using the thermocouples 50, 70 (the curve in thick broken line and the one drawn with crosses). This is because the ground temperatures measured downstream and upstream of the type P are decreasing whereas the temperatures of the sprinkled water as measured downstream and upstream of the tire are increasing. Measuring ground temperature using infrared pyrometers does not therefore appear to be a method that is reliable in the case of a wet road surface.

Next, during a second cycle, the temperature of the sprinkled water is changed and the road surface T1 is sprinkled with water at T=50° C. taken from the vehicle 10 (not depicted). The measurements taken in the first cycle are then taken again in the same way.

As many measurement cycles at as many different temperatures as necessary can be run.

The vehicle 10 is then driven over a second predetermined road surface T2 exhibiting different characteristics. These characteristics include, for example, the particle size. The various measurement cycles are then repeated on the second predetermined road surface T2 as many times as necessary.

The invention claimed is:

1. A test vehicle for measuring conditions on a road surface covered with water, the test vehicle comprising:
    a sprinkler for sprinkling the road surface with water taken from aboard the test vehicle;
    a temperature measurement device; and
    a tire to be tested, the tire being positioned downstream from the sprinkler and upstream of the temperature measurement device when considering a direction of travel of the test vehicle,
    wherein, when the test vehicle is running, the tire drives over sprinkled water from the sprinkler, and the temperature measurement device measures a water temperature of the sprinkled water over which the tire has driven, and
    wherein the temperature measurement device includes:
        a measurement member for measuring water temperature,
        a channelling unit, which directly channels water covering the road surface, the channelling unit including a measuring chamber for measuring a temperature of the channelled water, and the measurement member including a temperature measuring head situated in the measuring chamber, and
        a driving unit, which causes the measurement member and the channelling unit to be driven over the road surface in such a way that the temperature measuring head is situated at a distance from the road surface.

2. The test vehicle according to claim 1, further comprising a suspension unit, which suspends the temperature measurement device with respect to the test vehicle.

3. The test vehicle according to claim 1, further comprising a water storage unit that includes a cold source and a hot source, wherein water from the cold source has a lower temperature than water from the hot source.

4. The test vehicle according to claim 3, further comprising a mixer, which mixes the water from the cold source and the water from the hot source.

* * * * *

UNITED STATES PATENT AND TRADEMARK OFFICE
CERTIFICATE OF CORRECTION

PATENT NO. : 8,864,372 B2  
APPLICATION NO. : 13/046227  
DATED : October 21, 2014  
INVENTOR(S) : Jeremy Buisson Page 1 of 1

It is certified that error appears in the above-identified patent and that said Letters Patent is hereby corrected as shown below:

Specification

<u>COLUMN 5</u>

Line 50, "grip p" should read --grip µ--

Signed and Sealed this
Second Day of August, 2016

Michelle K. Lee
*Director of the United States Patent and Trademark Office*